US 8,844,833 B1

(12) United States Patent
Liu et al.

(10) Patent No.: US 8,844,833 B1
(45) Date of Patent: Sep. 30, 2014

(54) PORTABLE ELECTRONIC SYSTEM, ACCESSORY FOR ELECTRONIC DEVICE, AND METHOD FOR ACTIVATING APPLICATION OF ELECTRONIC DEVICE

(71) Applicant: Compal Electronics, Inc., Taipei (TW)

(72) Inventors: Kun-Yen Liu, Taipei (TW); Hsin Lu, Taipei (TW); Wei-Han Hu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 13/914,056

(22) Filed: Jun. 10, 2013

(51) Int. Cl.
*G06F 17/00* (2006.01)
*G06Q 90/00* (2006.01)
(52) U.S. Cl.
CPC .................................. *G06Q 90/00* (2013.01)
USPC ........................... 235/492; 235/375; 235/451
(58) Field of Classification Search
USPC .......................................... 235/375, 451, 492
See application file for complete search history.

(56) References Cited

U.S. PATENT DOCUMENTS

| | | | | |
|---|---|---|---|---|
| 5,969,613 | A * | 10/1999 | Yeager et al. | 340/572.9 |
| 2006/0163349 | A1 * | 7/2006 | Neugebauer | 235/383 |
| 2008/0309491 | A1 * | 12/2008 | Gillard et al. | 340/572.1 |
| 2009/0255535 | A1 * | 10/2009 | Kanzer | 128/206.14 |
| 2011/0197006 | A1 * | 8/2011 | Li et al. | 710/301 |
| 2012/0168516 | A1 * | 7/2012 | Bolger et al. | 235/492 |
| 2012/0305445 | A1 * | 12/2012 | Hu | 206/775 |

FOREIGN PATENT DOCUMENTS

| | | | |
|---|---|---|---|
| JP | 2006055627 A | * | 3/2006 |
| TW | 201205270 A | | 2/2012 |
| TW | M436364 | | 9/2012 |

* cited by examiner

*Primary Examiner* — Tuyen K Vo
(74) *Attorney, Agent, or Firm* — Muncy, Geissler, Olds & Lowe, P.C.

(57) ABSTRACT

A portable electronic system includes a movable structure, a protective structure and an electronic device. The movable structure is disposed on the protective structure. The movable structure includes a wireless communication tag thereon. The electronic device is accommodated in the protective structure, and includes a signal detection unit and an application activation unit. The movable structure is movable on the protective structure to approach or leave the electronic device. The signal detection unit is used for detecting a signal wirelessly transmitted by the wireless communication tag when the distance between the movable structure and the electronic device is less than a predetermined value. The application activation unit is used for activating an application in response to the signal detected by the signal detection unit.

15 Claims, 3 Drawing Sheets

PORTABLE ELECTRONIC SYSTEM, ACCESSORY FOR ELECTRONIC DEVICE, AND METHOD FOR ACTIVATING APPLICATION OF ELECTRONIC DEVICE

BACKGROUND

1. Technical Field

Embodiments of the present invention relate to an electronic system. More particularly, embodiments of the present invention relate to a portable electronic system, an accessory for an electronic device and a method for activating an application of the electronic device.

2. Description of Related Art

Nowadays the smart phone is becoming so indispensable in our daily life because it performs as a portable computer, which enables the user to browse the Internet or activate applications with a wide variety of functions.

However, if the user would like to activate an application, he or she may have to touch the screen, and select the icon corresponding to the application, which is considered inconvenient to the user in the operation of the smart phone.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one aspect of the present invention, a portable electronic system is provided. This portable electronic system includes a movable structure, a protective structure and an electronic device. The movable structure is disposed on the protective structure and includes a wireless communication tag thereon. The electronic device is accommodated in the protective structure, and includes a signal detection unit and an application activation unit. The movable structure is movable on the protective structure to approach or leave the electronic device. The signal detection unit is used for detecting a signal wirelessly transmitted by the wireless communication tag when the distance between the movable structure and the electronic device is less than a predetermined value. The application activation unit is used for activating an application in response to the signal detected by the signal detection unit.

In another aspect of the present invention, an accessory for an electronic device is provided. This accessory includes a protective structure and a movable structure. The protective structure is used for accommodating an electronic device. The movable structure is disposed on the protective structure and is movable on the protective structure. The movable structure includes a wireless communication tag thereon for activating an application of the electronic device.

In yet another aspect of the present invention, a method for activating an application of an electronic device is provided. This method includes the steps of: moving a movable structure along a protective structure to approach the electronic device, wherein the movable structure is disposed on the protective structure and includes a wireless communication tag thereon; detecting a signal wirelessly transmitted by the wireless communication tag by a signal detection unit of the electronic device; and activating an application in response to the signal by an application activation unit.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
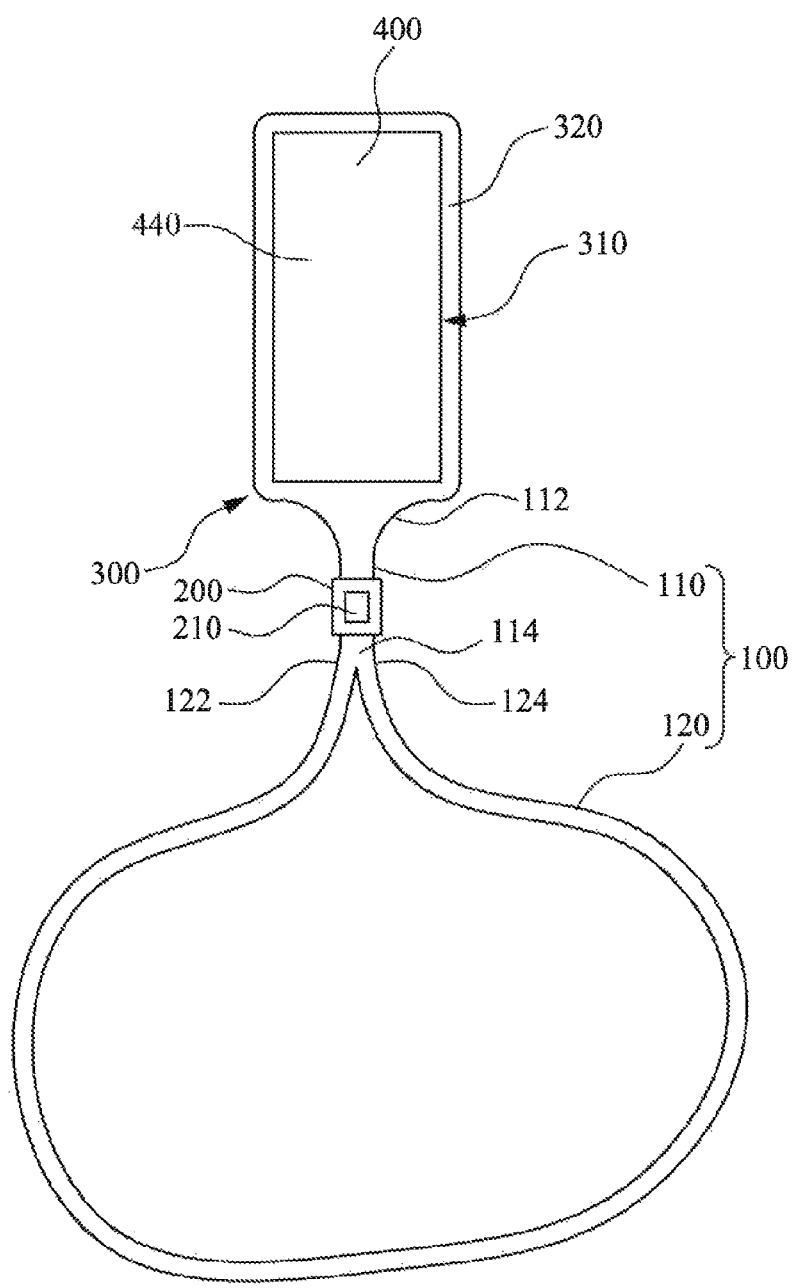
FIG. 1 is a schematic top view of a portable electronic system in accordance with one embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic top view of a portable electronic system in accordance with one embodiment of the present invention. As shown in FIG. 1, the portable electronic system includes an electronic device 400 and an accessory for the electronic device 400. The accessory includes a movable structure 200 and a protective structure 300. The protective structure 300 is used for accommodating the electronic device 400. The movable structure 200 is disposed on the protective structure 300 and is movable on the protective structure 300 to approach or leave the electronic device 400. In particular, the protective structure 300 includes a strap 100, and the movable structure 200 can be a ring. The movable structure 200 enfolds a part of the strap 100, and can slide on the strap 100. The movable structure 200 includes a wireless communication tag 210 thereon for activating an application of the electronic device 400.

Figure 2:
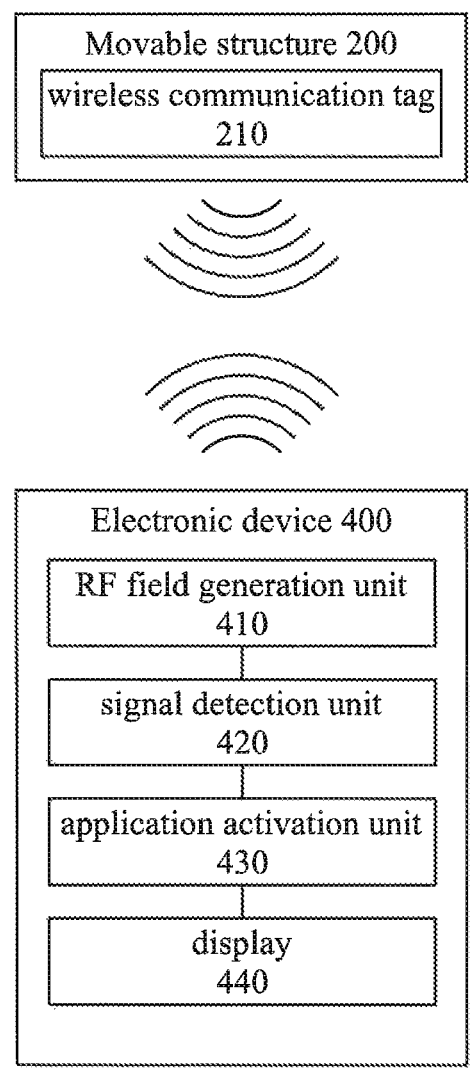
FIG. 2 is a functional block diagram of the portable electronic system in accordance with one embodiment of the present invention.

Reference is now made to FIG. 2. FIG. 2 is a functional block diagram of the portable electronic system in accordance with one embodiment of the present invention. As shown in FIG. 2, the electronic device 400 includes a signal detection unit 420 and an application activation unit 430 electrically connected to the signal detection unit 420. The signal detection unit 400 is used for detecting a signal wirelessly transmitted by the wireless communication tag 210. The application activation unit 430 is used for activating an application in response to the signal detected by the signal detection unit 420.

For example, in some embodiments, the wireless communication tag 210 and the signal detection unit 420 can be compatible with the standards of the near field communication (NFC), so that they can communicate with each other in the standards of the NFC. In particular, the electronic device 400 may further include a radio frequency (RF) field generation unit 410 for powering the wireless communication tag 210, so that the wireless communication tag 210 may transmit the signal to the signal detection unit 420 without any battery therein. The RE field generation unit 410 generates the RF field. The "RF field" in this context refers to an electromagnetic field generated by an alternating current for wireless broadcasting or communication.

When the movable structure 200 approaches the electronic device 400 such that the distance therebetween is less than a predetermined value, such as 10 cm, the wireless communication tag 210 is in the RF field generated by the RF field generation unit 410, and therefore, the wireless communication tag 210 is powered due to the inductive coupling and therefore generates the signal. Then, the signal detection unit 420 can detect the signal transmitted by the wireless communication tag 210 of the movable structure 200. When the signal detection unit 420 detects the signal or measures a particular strength of the signal, the application activation unit 430 can activate the application. Hence, according to the foregoing embodiments, the user only needs to move the movable structure 200 to approach the electronic device 400, and the application can be activated without touching the screen. It is understood that the wireless communication tag 210 can preferably include a coil therein for inductive coupling.

In some embodiments, the application can be, but is not limited to be, Facebook™, Skype™, Yahoo Messenger™, and so on. In some embodiments, the application activation unit 430 activates the application when the distance between the movable structure 200 and the electronic device 400 is less than a predetermined value, such as 10 cm.

In some embodiments, as shown in FIG. 2, the electronic device 400 includes a display 440. The display 440 is electrically connected to the application activation unit 430 for showing the application in response to the signal detected by the signal detection unit 420. For example, if the application is Facebook™, the display 440 can show the web page presenting Facebook™ when the movable structure 200 approaches the electronic device 400. In some embodiments, as shown in FIG. 1, the protective structure 300 has an opening 310 thereon. The display 440 is exposed by the opening 310, such that the user can directly see the web page presenting the application, such as, for example, Facebook™. The area of the opening 310 is preferably not less than the area of the display 440, so as to expose the display 440.

In some embodiments, as show in FIG. 1, a part of the strap 100 is in interference fit with the movable structure 200. In other words, the movable structure 200 can be temporarily secured on the strap 100 by the static friction force therebetween, so as to prevent from erroneously activating the application. In this case, when the user desires to move the movable structure 200, he or she can apply a force to the movable structure 200, in which the applied force is greater than the static friction force, so that the movable structure 200 can slide on the strap 100 to approach or leave the electronic device 400.

In some embodiments, as shown in FIG. 1, the strap 100 can be, but is not limited to be, a necklace strap or a hand strap. In particular, in some embodiments, the strap 100 includes a first strap body 110 and a second strap body 120, and the protective structure 300 includes a protective cover 320. The first body 110 includes a first end 112 and a second end 114 opposite to the first end 112. The first end 112 is connected to the protective cover 320. The second strap body 120 includes a third end 122 and a fourth end 124 opposite to the third end 122. The second strap body 120 is bended like a ring, such that the third end 122 and the fourth end 124 are both connected to the second end 114 of the first strap body 110. The bended second strap body 120 can be hung on the neck or the hand of the user, so that the strap 100 can be the necklace strap or the hand strap.

In some embodiments, the first strap body 110, the second strap body 120 and the protective cover 320 can be integrally formed as one piece, thereby constructing an integrally formed accessory.

In some embodiments, the electric device 400 can be, but is not limited to be, a cell phone, a tablet PC, or a PDA.

Figure 3:
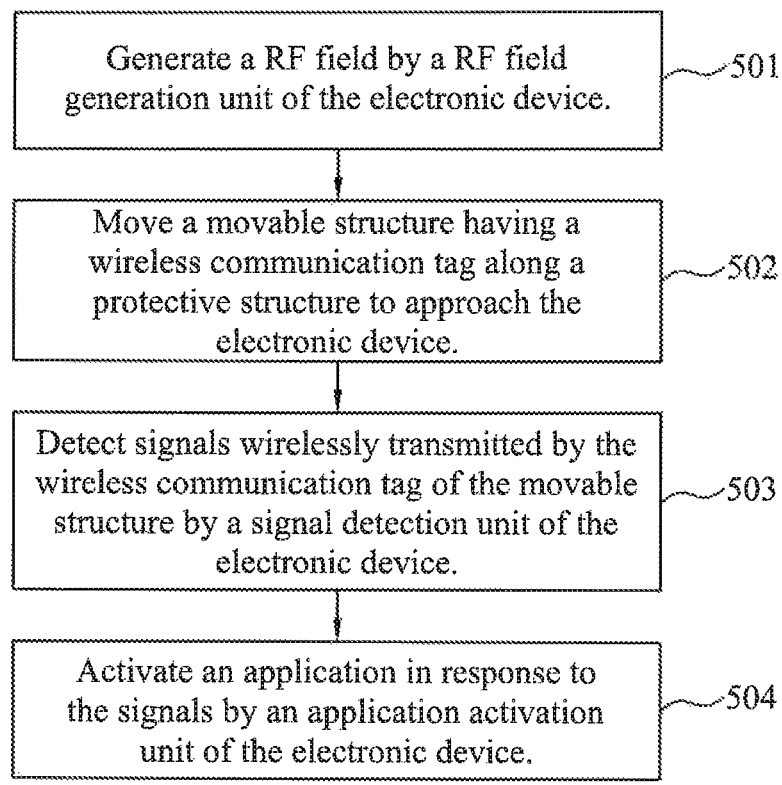
FIG. 3 is a flow chart presenting the method for activating the application of the electronic device in accordance with one embodiment of the present invention.

FIG. 3 is a flow chart presenting the method for activating the application of the electronic device in accordance with one embodiment of the present invention. As shown in FIG. 3, the method includes the steps as follows.

In step 501, the RF field generation unit of the electronic device generates the RE field.

In step 502, the movable structure is moved along the protective structure to approach the electronic device. In particular, when the movable structure is moved such that the distance between the movable structure and the electronic device is less than a predetermined value, such as 10 cm, the RF field generated by the RF field generation unit can power the wireless communication tag by the induction coupling.

In step 503, the signal detection unit of the electronic device detects the signal wirelessly transmitted by the wireless communication tag of the movable structure. In particular, when the wireless communication tag is powered by the RF field, it can transmit the signal to the signal detection unit.

In step 504, the application activation unit of the electronic device activates an application in response to the signal detected by the signal detection unit. Further, the display can show the application to the user, such as showing the web page presenting Facebook™.

Hence, according to the foregoing embodiments, when the user moves the movable structure to approach the electronic device, such that the distance between the movable structure and the electronic device is less than a predetermined value, the application can be activated, and the user doesn't have to touch the screen, which improves the convenience for operating the electronic device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A portable electronic system, comprising:
   a protective structure;
   a movable structure disposed on the protective structure, the movable structure comprising a wireless communication tag thereon; and
   an electronic device accommodated in the protective structure, wherein the movable structure is movable on the protective structure to approach or leave the electronic device, the electronic device comprising:
   a signal detection unit for detecting a signal wirelessly transmitted by the wireless communication tag when the distance between the movable structure and the electronic device is less than a predetermined value; and
   an application activation unit for activating an application in response to the signal detected by the signal detection unit.

2. The portable electronic system of claim 1, wherein the protective structure comprises a strap, and the movable structure is disposed on the strap.

3. The portable electronic system of claim 2, wherein the strap is in interference fit with the movable structure.

4. The portable electronic system of claim 2, wherein the strap is a necklace strap or a hand strap.

5. The portable electronic system of claim 2, wherein the protective structure comprises a protective cover, wherein the strap comprises:
  a first strap body having a first end and a second end opposite to the first end, wherein the first end is connected to the protective cover; and
  a second strap body having a third end and a fourth end opposite to the third end, wherein the third end and the fourth end are connected to the second end of the first strap body.

6. The portable electronic system of claim 1, wherein the wireless communication tag and the signal detection unit are compatible with standards of the near field communication (NFC).

7. The portable electronic system of claim 1, wherein the electronic device comprises:
  a display electrically connected to the application activation unit for showing the application in response to the signal detected by the signal detection unit.

8. The portable electronic system of claim 7, wherein the protective structure has an opening thereon, and the display is exposed by the opening.

9. The portable electronic system of claim 1, wherein the electronic device comprises an RF field generation unit for powering the wireless communication tag.

10. An accessory for an electronic device, comprising:
  a protective structure for accommodating the electronic device, the protective structure having an opening thereon for exposing a display of the electronic device; and
  a movable structure disposed on the protective structure and being movable on the protective structure, wherein the movable structure comprises a wireless communication tag thereon for activating an application of the electronic device.

11. The accessory for the electronic device of claim 10, wherein the protective structure comprises a strap, and the movable structure is disposed on the strap.

12. The accessory for the electronic device of claim 11, wherein the part of the strap is in interference fit with in the movable structure.

13. The accessory for the electronic device of claim 11, wherein the strap is a necklace strap or a hand strap.

14. The accessory for the electronic device of claim 11, wherein the protective structure comprises a protective cover, wherein the strap comprises:
  a first strap body having a first end and a second end opposite to the first end, wherein the first end is connected to the protective cover; and
  a second strap body having a third end and a fourth end opposite to the third end, wherein the third end and the fourth end are connected to the second end of the first strap body.

15. The accessory for the electronic device of claim 10, wherein the wireless communication tag is compatible with standards of the near field communication (NFC).

* * * * *